(12) United States Patent
Murase et al.

(10) Patent No.: US 9,969,299 B2
(45) Date of Patent: May 15, 2018

(54) TRAFFIC SYSTEM AND POWER SUPPLY METHOD

(71) Applicant: MITSUBISHI HEAVY INDUSTRIES, LTD., Tokyo (JP)

(72) Inventors: Kosaku Murase, Tokyo (JP); Yukihide Yanobu, Tokyo (JP); Hisashi Motoyama, Tokyo (JP); Masato Suzuki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 295 days.

(21) Appl. No.: 14/777,292

(22) PCT Filed: Apr. 4, 2014

(86) PCT No.: PCT/JP2014/059970
§ 371 (c)(1),
(2) Date: Sep. 15, 2015

(87) PCT Pub. No.: WO2014/168086
PCT Pub. Date: Oct. 16, 2014

(65) Prior Publication Data
US 2016/0046206 A1 Feb. 18, 2016

(30) Foreign Application Priority Data
Apr. 12, 2013 (JP) ................. 2013-084183

(51) Int. Cl.
*B60M 5/00* (2006.01)
*B60L 5/42* (2006.01)
(Continued)

(52) U.S. Cl.
CPC ............ *B60M 5/00* (2013.01); *B60L 5/42* (2013.01); *B60L 9/00* (2013.01); *B60M 1/12* (2013.01); *B60M 1/36* (2013.01); *B60L 2200/26* (2013.01)

(58) Field of Classification Search
CPC .. B60M 5/00; B60M 1/12; B60M 1/36; B60L 5/42; B60L 5/00; B60L 5/04; B60L 5/08; B60L 5/18; B60L 5/30; B60L 9/00
(Continued)

(56) References Cited

U.S. PATENT DOCUMENTS 3,002,059 A * 9/1961 Mageoch ................. B60M 1/36
191/17
RE29,994 E * 5/1979 Bossi ...................... B60L 11/18
191/1 R
(Continued)

FOREIGN PATENT DOCUMENTS

DE 10313698 A1 5/2005
JP 10-4604 A 1/1998
(Continued)

OTHER PUBLICATIONS

International Search Report dated Jul. 1, 2014, corresponding to International Patent Application No. PCT/JP2014/059970.
(Continued)

*Primary Examiner* — Mark T Le
(74) *Attorney, Agent, or Firm* — Kanesaka Berner and Partners LLP

(57) ABSTRACT

A traffic system includes: a vehicle having a power-receiving section on an outer surface thereof; and a ground facility having a power-supply section for supplying the power-receiving section with power by coming in contact with the power-receiving section. The power-supply section has a spring for applying a biasing force to a power-supply shoe in the power-supply section toward the power-receiving section. The power-receiving section has a flat surface that extends along the outer surface of the vehicle, and tapered surfaces that are connected to the flat surface in the forward and backward moving directions of the vehicle and guide the power-supply shoe to the flat surface against the biasing
(Continued)

force to bring the power-supply shoe into contact with the flat surface when the vehicle moves backward and forward.

7 Claims, 6 Drawing Sheets

(51) Int. Cl.
    *B60M 1/36*       (2006.01)
    *B60L 9/00*        (2006.01)
    *B60M 1/12*       (2006.01)

(58) Field of Classification Search
    USPC ........................................................ 320/109
    See application file for complete search history.

(56) References Cited

U.S. PATENT DOCUMENTS

2009/0121678 A1* 5/2009 Mitake ...................... B60L 5/42
                                                                              320/109
2012/0111682 A1* 5/2012 Andre ....................... B60L 5/42
                                                                              191/40
2013/0092492 A1* 4/2013 Andre ....................... B60L 5/42
                                                                              191/47

FOREIGN PATENT DOCUMENTS

| JP | 2002-191103 A | 7/2002 |
| JP | 2006-246568 A | 9/2006 |
| JP | 2008-211939 A | 9/2008 |
| JP | 2011-526858 A | 10/2011 |
| JP | 2012-80628 A | 4/2012 |
| WO | 2010/003021 A2 | 1/2010 |
| WO | 2011/079215 A2 | 6/2011 |
| WO | 2013/050991 A2 | 4/2013 |

OTHER PUBLICATIONS

Written Opinion dated Jul. 1, 2014, corresponding to International Patent Application No. PCT/JP2014/059970.
Office Action in JP Application No. 2013-084183, dated Jan. 31, 2017.

* cited by examiner

TRAFFIC SYSTEM AND POWER SUPPLY METHOD

RELATED APPLICATIONS

The present application is a National Phase of International Application Number PCT/JP2014/059970, filed Apr. 4, 2014, which claims priority from Japanese Application Number 2013-084183, filed Apr. 12, 2013.

TECHNICAL FIELD

The present invention relates to a traffic system that supplies power to a vehicle from a ground facility, and a power supply method for a vehicle.

BACKGROUND ART

Electric vehicles driven by electric power of an electric storage device mounted therein have been known. As such electric vehicles, vehicles, electric buses, etc. that are used in an overhead wireless traffic system running on a track with no overhead wires have been known.

In the electric vehicles, a boosting charge is performed, for instance, by a charging device at a station during a short stoppage time.

An example of such a charging device is disclosed in Patent Document 1. This charging device has a constitution in which a contact is provided at a roof of a vehicle and a power-supply shoe is attached to a ground structure above the contactor. Thus, the contact is sandwiched in a widthwise direction by the power-supply shoe, and the contact and the power-supply shoe carry a current. Thereby, power can be supplied to the vehicle from a ground facility.

DOCUMENT OF RELATED ART

Patent Document

[Patent Document 1]
Japanese Unexamined Patent Application, First Publication No. 2008-211939

SUMMARY OF INVENTION

Technical Problem

However, the vehicle is generally influenced by unbalanced pneumatic pressures of the left and right tires, unbalanced left and right weights thereof, a slope of a road, and so on. Thereby, the vehicle may be inclined with respect to a horizontal direction. In such a situation, if the charging device of Patent Document 1 is used, a shift occurs at a position relation between the contactor and the power-supply shoe, and an excellent contact state may not be obtained between the contactor and the power-supply shoe.

The present invention provides a traffic system capable of supplying power regardless of a position of a vehicle, and a power supply method.

Solution to Problem

According to a first aspect of the present invention, a traffic system includes: a vehicle having a power-receiving section an outer surface of the vehicle; and a ground facility having a power-supply section for supplying the power-receiving section with power by coming in contact with the power-receiving section. One of the power-receiving section and the power-supply section includes a biasing part which applies biasing force to the one of the power-receiving section and the power-supply section so that the one of the power-receiving section and the power-supply section is biased toward the other of the power-receiving section and the power-supply section. The other of the power-receiving section and the power-supply section includes a flat surface that extends along the outer surface of the vehicle, and guide surfaces that are connected to the flat surface in forward and backward moving directions of the vehicle and guide the one of the power-receiving section and the power-supply section to the flat surface against the biasing force to bring the one into contact with the flat surface when the vehicle moves backward or forward.

According to this traffic system, since one of the power-receiving section and the power-supply section is guided by the guide surfaces depending on the forward and backward movement of the vehicle, the guide surface can smoothly lead the one onto the flat surface regardless of a position of the vehicle. In addition, since one of the power-receiving section and the power-supply section is biased to the other by the biasing part, even if the vehicle is in an inclined state, the one can be pressed against the other and obtain an excellent contact state.

According to a second aspect of the present invention, the guide surfaces may have tapered surfaces that extend in directions away from either one of the power-receiving section and the power-supply section, one of which has the biasing part, in proportion to a distance from connecting portions between the guide surfaces and the flat surface in the forward and backward moving directions.

As one of the power-receiving section and the power-supply section is smoothly led to the flat surface by the tapered surface, the power-receiving section and the power-supply section can be well brought into contact with each other.

According to a third aspect of the present invention, the power-receiving section may be provided at a floor portion or a lateral portion of the vehicle.

By providing the power-receiving section at such a position, repair work and checkup work become easy. In addition, thermal deformation or degradation of the power-receiving section caused by exposure to direct sunlight can be prevented.

According to a fourth aspect of the present invention, a plurality of power-supply sections may be provided.

The power with a high current can be supplied by the plurality of power-supply sections. Thus, in this case, since a load per each of the power-supply sections can be reduced, a structure of each of the power-supply sections can be simplified. Further, even if a failure occurs at any of the power-supply sections, the power can be supplied by another power-supply section. That is, due to a fail-safe function, the power can be stably supplied.

According to a fifth aspect of the present invention, a plurality of power-receiving sections may be provided.

The power with a high current can be received by the plurality of power-receiving sections. A structure of each of the power-receiving sections can be simplified. Further, due to a fail-safe function, the power can be stably received.

According to a sixth aspect of the present invention, the traffic system may further include a contact detection unit that is provided at the ground facility and detects a contact state between the power-receiving section and the power-supply section.

The contact detection unit is capable of checking whether or not the power-receiving section and the power-supply section are in contact with each other. Therefore, position adjustment of the vehicle, the power-receiving section, and the power-supply section is performed depending on a detection result of the contact detection unit. Thereby, the contact state can be adjusted, and the power can supplied in a better contact state.

According to a seventh aspect of the present invention, a power supply method is a method for supplying the power to the power-receiving section using the power-supply section in the traffic system, the power supply method includes: a guiding step of guiding either one of the power-receiving section and the power-supply section, one of which has the biasing part to the flat surface against the biasing force using the guide surface so as to bring the one of the power-receiving section and the power-supply section into contact with the flat surface; a power-supply step of beginning to supply the power after the guiding step; and a power-supply-completing step of terminating the supply of power when the supply of a preset amount of power is completed.

According to the power supply method, the guide surface can smoothly lead one of the power-receiving section and the power-supply section onto the flat surface against the biasing force in the guiding step. Thereby, even if the vehicle is in an inclined state, one of the power-receiving section and the power-supply section can be pressed against the other of the power-receiving section and the power-supply section, and an excellent contact state can be obtained between the power-receiving section and the power-supply section.

According to an eighth aspect of the present invention, the power supply method may further include: a contact-checking step of checking the contact state between the power-receiving section and the power-supply section in response to a signal from the contact detection unit that is provided at the ground facility and detects the contact state between the power-receiving section and the power-supply section, the contact-checking step which is performed between the guiding step and the power-supply step; and a contact-adjusting step of performing position adjustment of at least one of the vehicle, the power-receiving section, and the power-supply section based on a result of the contact-checking step and adjusting the contact state.

The contact state between the power-receiving section and the power-supply section is adjusted by the contact-checking step and the contact-adjusting step, and the power can be supplied in a better contact state.

Effects of the Invention

According to the above-described traffic system and power supply method, an excellent contact state between the power-receiving section and the power-supply section can be obtained by the guide surface and the biasing part, and the power can be supplied regardless of the position of the vehicle.

DESCRIPTION OF EMBODIMENTS

First Embodiment

Hereinafter, a traffic system 1 according to a first embodiment of the present invention will be described.

In the present embodiment, the traffic system 1 is a new overhead wireless traffic system (automated people mover (APM)) that runs on a track 3.

Figure 1:
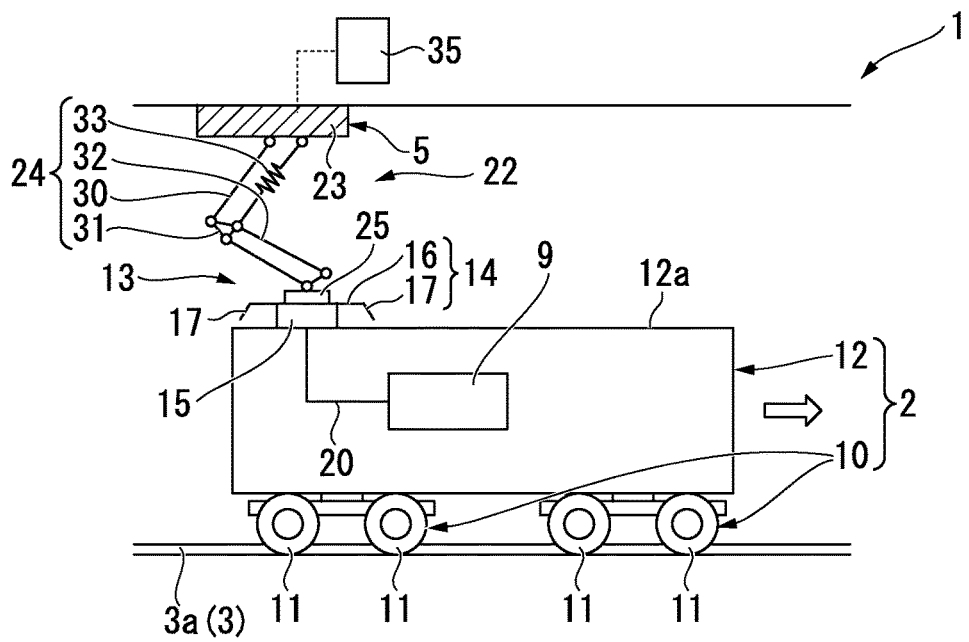
FIG. 1 is an overall side view of a traffic system according to a first embodiment of the present invention.

As illustrated in FIG. 1, this traffic system 1 is provided with a vehicle 2, a power-receiving section 13 provided at the vehicle 2, and a ground facility 5 having a power-supply section 22 supplying power to the power-receiving section 13.

The vehicle 2 has an undercarriage 10 with wheels 11 rolling on rails 3a provided on a track 3, and a vehicle body 12 supported from below by the undercarriage 10.

In addition, a storage battery 9 is mounted in the vehicle body 12, electric motors (not shown in figure) are driven by power from the storage battery 9, and the wheels 11 are rotated by the electric motors. Thereby, the vehicle 2 runs on the rails 3a.

Figure 2:
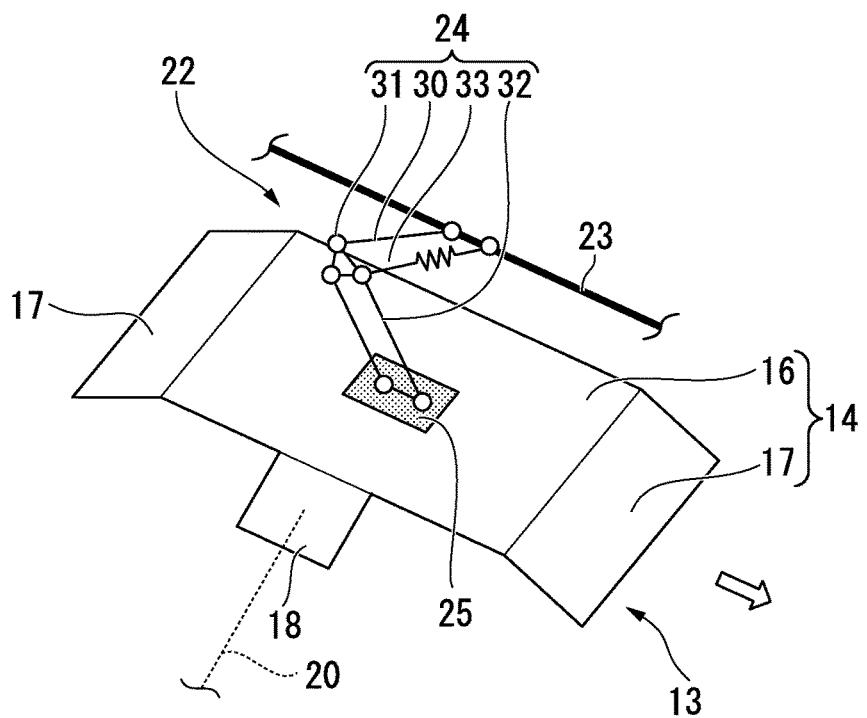
FIG. 2 is an enlarged perspective view illustrating a power-receiving section and a power-supply section in the traffic system according to the first embodiment of the present invention.
Figure 3:
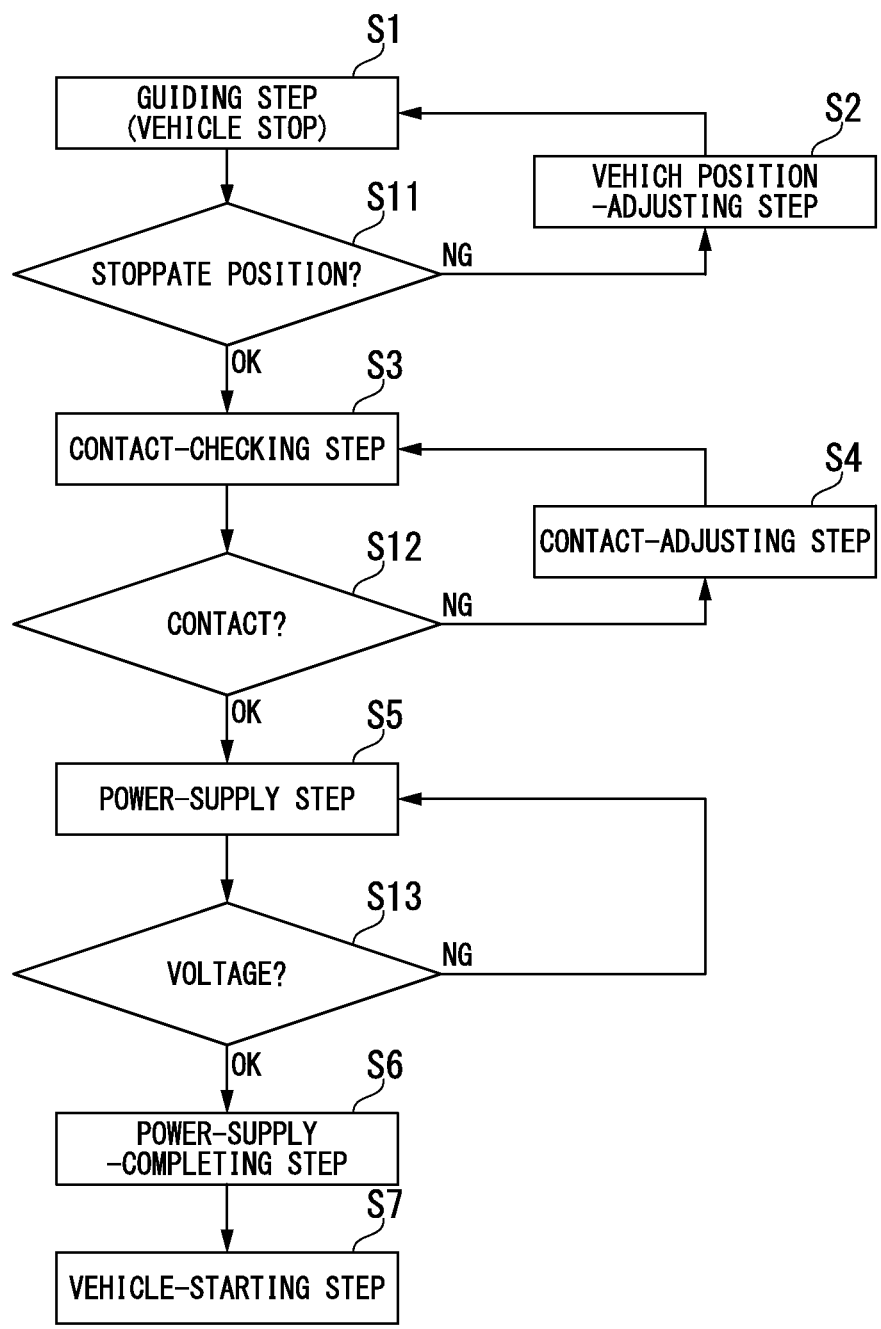
FIG. 3 is flowchart describing a process of a power supply method relating to the traffic system according to the first embodiment of the present invention.

As illustrated in FIGS. 1 and 2, the power-receiving section 13 is provided at an outer surface of a rooftop 12a of the vehicle body 12, and has a plate part 14 using a metal such as aluminum, copper, or stainless steel as a material, and a support 15 provided between the plate part 14 and an outer surface of the vehicle body 12.

The plate part 14 has a flat surface 16 that extends along the outer surface of the rooftop 12a of the vehicle body 12 in a forward and backward direction of the vehicle body 12 which is a direction in which the vehicle 2 moves forward or backward and in a widthwise direction of the vehicle body 12, and a pair of front and rear tapered surfaces (guide surfaces) 17 that are connected in a forward and backward direction of the flat surface 16 and extend to approach the outer surface of the vehicle body 12 in proportion to a distance from the flat surface 16 in the forward and backward directions. In the present embodiment, the tapered surfaces 17 have a flat panel shape.

Further, the plate part 14 has a terminal surface 18 connected to the flat surface 16 so as to protrude toward one side in the widthwise direction of the vehicle body 12. Thus, the terminal surface 18 and the storage battery 9 are electrically connected by a wiring 20. The terminal surface 18 has only to perform electrical connection between the storage battery 9 and the plate part 14, and is not limited to the above-described shape. In addition, the plate part 14 and the storage battery 9 may be directly electrically connected by the wiring 20 without providing the terminal surface 18.

The support 15 fixes the flat surface 16 of the plate part 14 to the outer surface of the rooftop 12a via an insulator (not shown in figure) for insulation provided on the rooftop 12a of the vehicle body 12.

The ground facility 5 is provided, for instance, at a station, and has the power-supply section 22, a structure 23 supporting the power-supply section 22, a battery charger (not shown in figure) supplying power from a substation to the power-supply section 22 when the vehicle 2 stops at the station, and a control device (not shown in figure) controlling a charging time and a charge amount.

The power-supply section 22 has a link member 24 that extends from the structure 23 above the power-receiving section 13 toward the power-receiving section 13 when the vehicle 2 stops at a predetermined position in the station.

In addition, the power-supply section 22 has a power-supply shoe 25 that is attached to the link member 24 so as to be able to come into contact with the flat surface 16 of the power-receiving section 13 and supplies the power from the ground facility 5 to the power-receiving section 13 through the contact with the flat surface 16.

The link member 24 has a first connecting member 30 that extends in a first direction (backward direction in the present embodiment) of the forward and backward directions as it continues downward from the structure 23 and is provided between the structure 23 and the power-receiving section 13 so as to be relatively rotatable in a three-dimensional direction, and a rotating member 31 that is attached to a lower end of the first connecting member 30 so as to be relatively rotatable in a three-dimensional direction with respect to the first connecting member 30.

Further, the link member 24 has a second connecting member 32 that is attached to the rotating member 31 and extends in a second direction (forward direction in the present embodiment) of the forward and backward directions as it continues downward, and a spring (biasing part) 33 that is provided between the rotating member 31 and the structure 23. The spring 33 may be various springs such as a coil spring and a leaf spring, which provide a biasing force to the power-supply shoe 25 toward the power-receiving section 13 so as to press the power-supply shoe 25 against the power-receiving section 13.

The power-supply shoe 25 uses a sintered metal or carbon as a material, is attached to a lower end of the second connecting member 32, has a plate shape, and is electrically connected to the battery charger of the ground facility 5 through the link member 24. Further, a surface area of the power-supply shoe 25 is smaller than that of the flat surface 16 of the power-receiving section 13.

Here, the traffic system 1 is further provided with a contact detection unit 35 that detects a contact state when the power-receiving section 13 and the power-supply section 22 are in contact with each other.

In the contact detection unit 35, for example, a known distance sensor that can detect a distance between the power-supply shoe 25 and the flat surface 16 or a device that detects a change in load impedance when the power-supply shoe 25 and the flat surface 16 come into contact with each other may be used, and is provided at the control device (not shown in figure), for instance, in the above-described ground facility 5.

Next, a process of the power supply method for the vehicle 2 will be described with reference to FIG. 3 and FIGS. 4A to 4C.

The power supply method includes a guiding step S1 of guiding the power-supply shoe 25 using the tapered surfaces 17 when the vehicle 2 stops at a predetermined power-supply position at which power is supplied at a station, and a vehicle position-adjusting step S2 of adjusting a stoppage position.

In addition, the power supply method includes a contact-checking step S3 of checking a contact state between the power-receiving section 13 and the power-supply section 22 when the stoppage position of the vehicle 2 becomes the predetermined power-supply position, and a contact-adjusting step S4 of adjusting the contact state.

Further, the power supply method includes a power-supply step S5 of beginning to supply power from the power-supply section 22 after the contact-adjusting step S4, a power-supply-completing step S6 of terminating the power supply when the supply of a predetermined amount of power to the storage battery 9 is completed, and then, a vehicle-starting step S7 of starting the vehicle 2.

First, the guiding step S1 is performed.

Figure 4A:
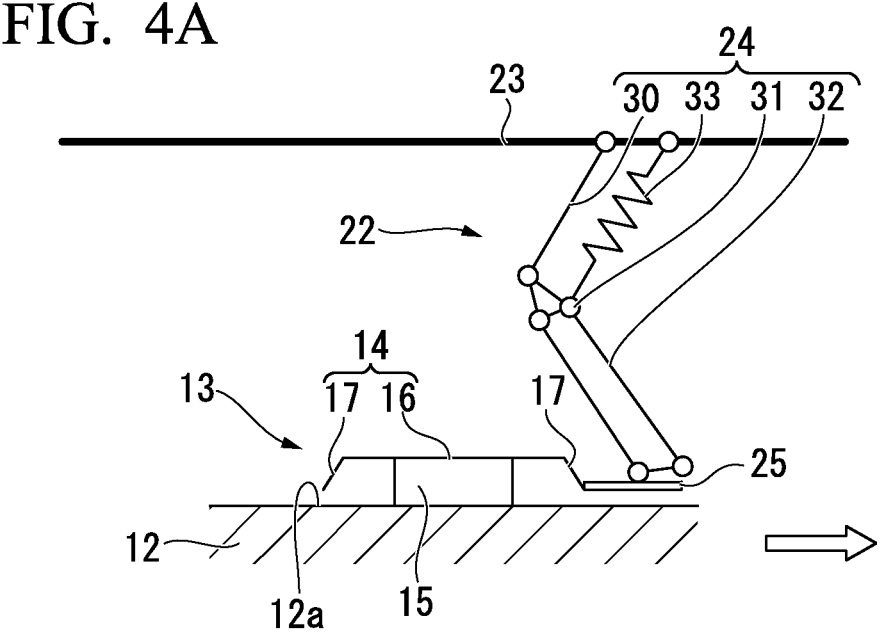
FIG. 4A is a side view illustrating a state in which the power-supply section and the power-receiving section come into contact with each other in a guiding step relating to the traffic system according to the first embodiment of the present invention in chronological order.

In the guiding step S1, as illustrated in FIG. 4A, the power-supply shoe 25 of the power-supply section 22 comes into contact with the tapered surface 17 of the power-receiving section 13 accompanying the movement of the vehicle 2, and is raised upward against the biasing force of the spring 33. Thus, by the movement of the vehicle 2 without a change, the power-supply shoe 25 is guided onto the tapered surface 17 while being further raised upward. In this case, in the power-supply section 22 of the present embodiment, the spring 33 is deformed to be extended.

Figure 4B:
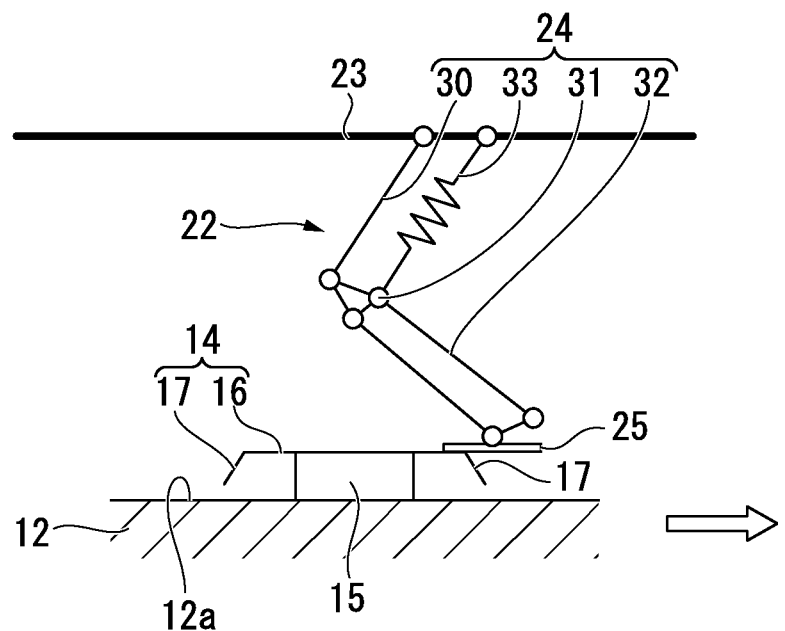
FIG. 4B is a side view illustrating a state in which the power-supply section and the power-receiving section come into contact with each other in a guiding step relating to the traffic system according to the first embodiment of the present invention in chronological order.

Further, as illustrated in FIG. 4B, if the power-supply shoe 25 moves past the connecting portion between the tapered surface 17 and the flat surface 16, the spring 33 stops extending and a constant length is maintained, and the power-supply shoe 25 is biased on a flat plate by the biasing force of the spring 33. In this state, the power-supply shoe 25 moves onto the flat surface 16 according to the movement of the vehicle 2.

Figure 4C:
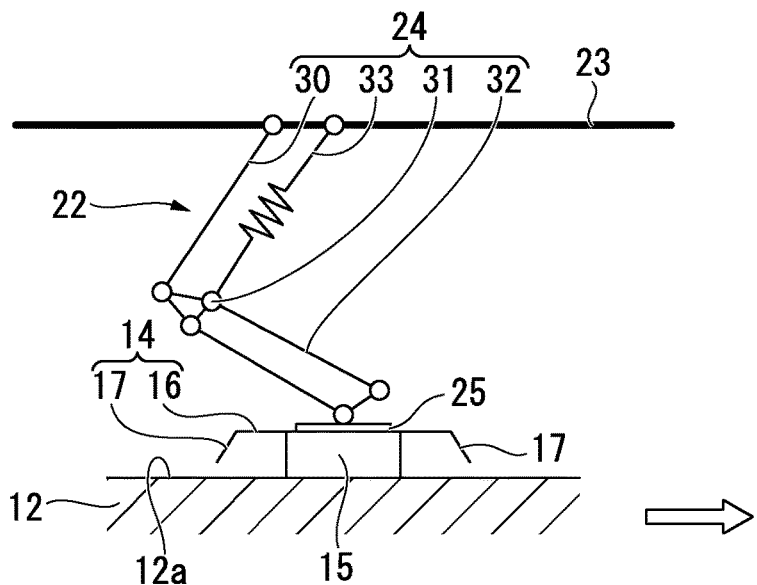
FIG. 4C is a side view illustrating a state in which the power-supply section and the power-receiving section come into contact with each other in a guiding step relating to the traffic system according to the first embodiment of the present invention in chronological order.

Then, as illustrated in FIG. 4C, when the vehicle 2 is stopped, the power-supply shoe 25 is stopped at an approximately central position on the flat plate in a forward and backward direction. This position is the above-described predetermined power-supply position.

In this way, at the point in time when the vehicle 2 stops, the stoppage position of the vehicle 2 is checked (S11). Thus, when it is determined that the stoppage position is the above-described predetermined power-supply position, the contact-checking step S3 is performed. On the other hand, when it is determined that the stoppage position is not the predetermined power-supply position, the vehicle position-adjusting step S2 is performed. After the vehicle 2 stops at the predetermined power-supply position, the contact-checking step S3 is performed. Here, the stoppage position of the vehicle 2 may be checked by visual observation or by a separate position sensor for detecting the position of the vehicle 2.

In the vehicle position-adjusting step S2, the vehicle 2 moves forward or backward in the forward and backward direction, and the stoppage position is adjusted such that the vehicle 2 is located at the predetermined power-supply position.

In the contact-checking step S3, it is checked in response to a detection signal from the contact detection unit 35 as to whether or not the flat surface 16 of the power-receiving section 13 and the power-supply shoe 25 of the power-supply section 22 are in contact with each other (S12). When it is determined that they are in contact with each other, the power-supply step S5 is performed. On the other hand, when it is determined that they are not in contact with each other, the contact-adjusting step S4 is performed. After they are in a contact state, the power-supply step S5 is performed.

In the contact-adjusting step S4, position adjustment is performed on at least one of the vehicle 2, the power-receiving section 13, and the power-supply section 22. The position adjustment of the vehicle 2 is performed by moving the vehicle 2 forward or backward in the forward and backward direction. In addition, the position adjustment of the power-receiving section 13 and the power-supply section 22 may be performed manually. When an electric motor or a control device is separately provided, the position adjustment of the power-receiving section 13 and the power-supply section 22 may be performed by remote control. In this case, the position adjustment is allowed using a method, for instance, of three-dimensionally operating the rotating member 31 of the power-supply section 22 and three-dimensionally operating, for instance, the support 15 of the power-receiving section 13.

In the power-supply step S5, preset power is supplied to the storage battery 9. Thus, it is checked whether or not a voltage of the storage battery 9 becomes a value equal to or more than a predetermined value (S13). When it is determined that the voltage is equal to or more than the predetermined value, the power-supply-completing step S6 is performed. On the other hand, when it is determined that the voltage has not reached the predetermined value, the power is continuously supplied. After the voltage is equal to or more than the predetermined value, the power-supply-completing step S6 is performed.

In the power-supply-completing step S6, in a state in which the power-supply shoe 25 is in contact with the flat surface 16 of the power-receiving section 13, the supply of power from the ground facility 5 is stopped. Thereby, the supply of power is terminated, and the process proceeds to the vehicle-starting step S7.

In the vehicle-starting step S7, the vehicle 2 is started after the power-supply-completing step S6.

In this traffic system 1, the power-supply shoe 25 of the power-supply section 22 is guided onto the flat surface 16 depending on the forward movement of the vehicle 2 while being pressed against the tapered surface 17. Therefore, as described above, even if the vehicle 2 is inclined in such a way that a first side thereof in the widthwise direction thereof is lowered and a second side thereof is raised, the tapered surface 17 resists the biasing force of the spring 33 to enable the power-supply shoe 25 to be smoothly guided onto the flat surface 16.

Further, since the power-supply shoe 25 is biased to the power-receiving section 13 by the spring 33, even if the vehicle body 12 is in an inclined state in this way, the power-supply shoe 25 is pressed against the flat surface 16 of the power-receiving section 13, and can secure an excellent contact state.

In addition, it can be checked by the contact detection unit 35 as to whether or not the power-receiving section 13 and the power-supply section 22 are in contact with each other. Therefore, the position adjustment of the vehicle 2, the power-receiving section 13, and the power-supply section 22 is performed according to the detection result of the contact detection unit 35, the contact state between the power-receiving section 13 and the power-supply section 22 can be adjusted, and the power can supplied in a better contact state.

As described above, according to the traffic system 1 of the present embodiment, the power can be supplied to the tapered surface 17 of the power-receiving section 13 and the spring 33 regardless of the position of the vehicle 2.

Figure 5:
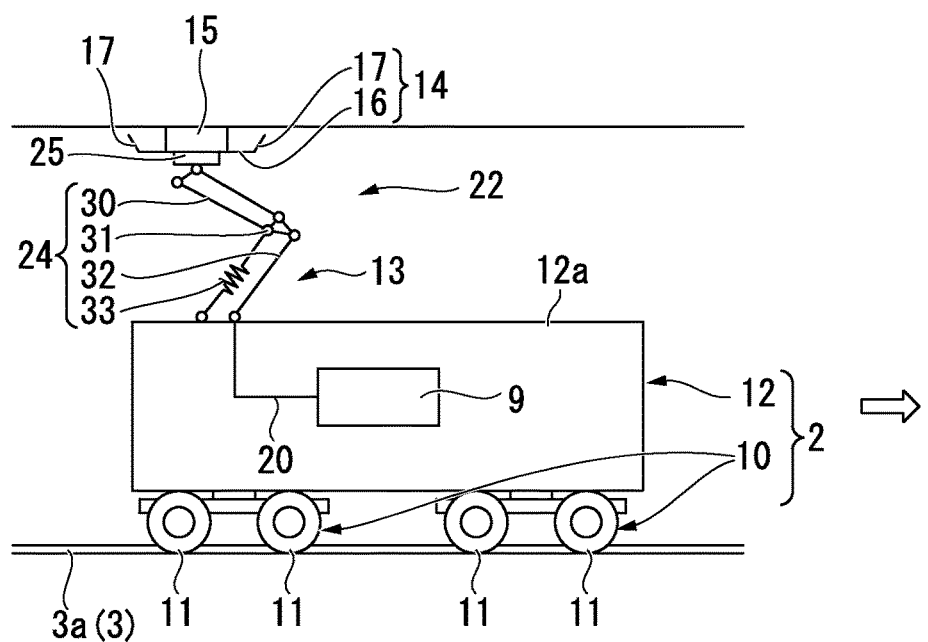
FIG. 5 is an overall side view of a traffic system according to a first variant example of the first embodiment of the present invention.

Here, the configuration of the power-supply section 22 and the configuration of the power-receiving section 13 may be reversed. That is, as illustrated in FIG. 5, the power-supply section 22 may be configured to have the plate part 14 and the support 15, and the power-receiving section 13 may be configured to have the link member 24 and the power-supply shoe.

Figure 6:
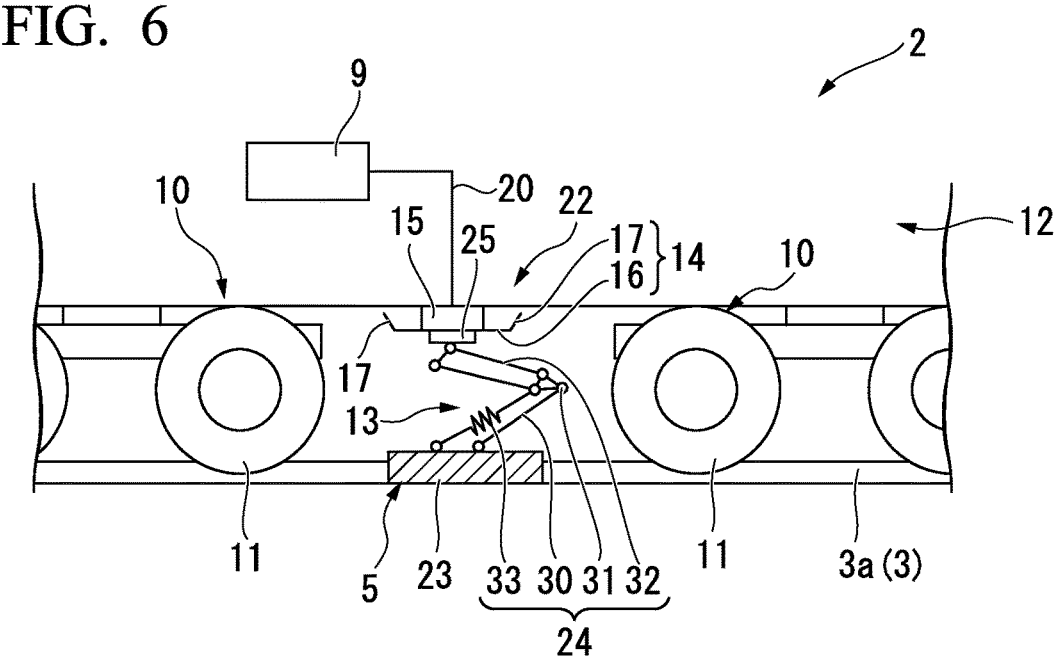
FIG. 6 is an overall side view of a traffic system according to a second variant example of the first embodiment of the present invention.

In addition, as illustrated in FIG. 6, the power-receiving section 13 may be provided at an outer surface of a floor portion of the vehicle body 12. In this case, the power-supply section 22 is provided at the track 3 below the power-receiving section 13 so as to face the flat surface 16 of the power-receiving section 13, and the tapered surfaces 17 of the power-receiving section 13 extend to be inclined upward in proportion to a distance from connecting portions between the tapered surfaces 17 and the flat surface 16 in a forward and backward direction so as to be separated from the power-supply section 22.

Figure 7:
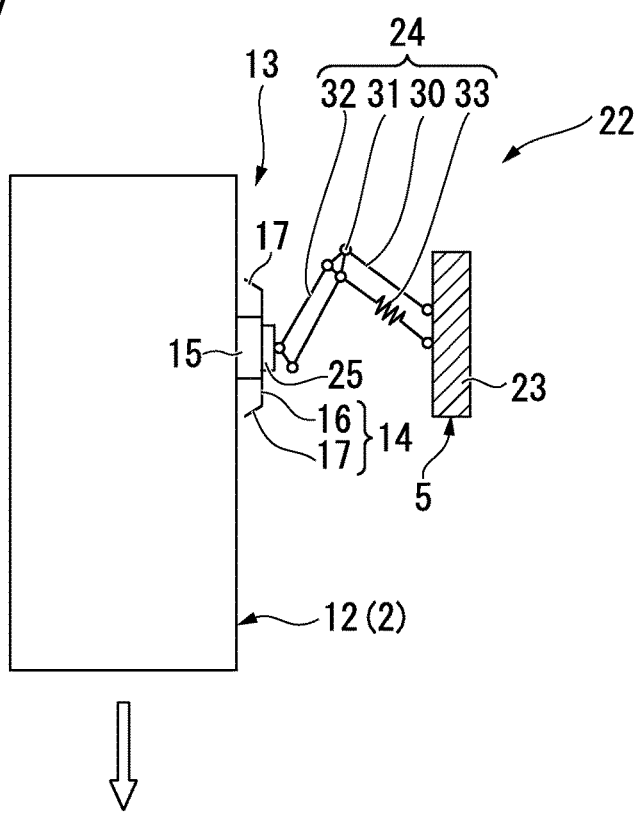
FIG. 7 is an overall side view of a traffic system according to a third variant example of the first embodiment of the present invention.

Further, as illustrated in FIG. 7, the power-receiving section 13 may be provided at an outer surface of a lateral portion of the vehicle body 12. In this case, the tapered surfaces 17 of the power-receiving section 13 extend to be inclined inward in the widthwise direction of the vehicle body 12 in proportion to a distance from connecting portions between the tapered surfaces 17 and the flat surface 16 in a forward and backward direction so as to be separated from the power-supply section 22.

Thus, an installation position of the power-receiving section 13 is not limited to the above-described case. For example, similar to a third rail type traffic system, the power-supply section 22 is provided together with the rail 3a, and the power-receiving section 13 is provided to face the power-supply section 22. The power may be supplied to the vehicle 2.

Second Embodiment

Next, a traffic system 1A according to a second embodiment of the present invention will be described.

The same components as in the first embodiment are given the same reference signs, and detailed description thereof will be omitted.

In the present embodiment, a power-supply section 22 is different from that of the first embodiment.

Figure 8:
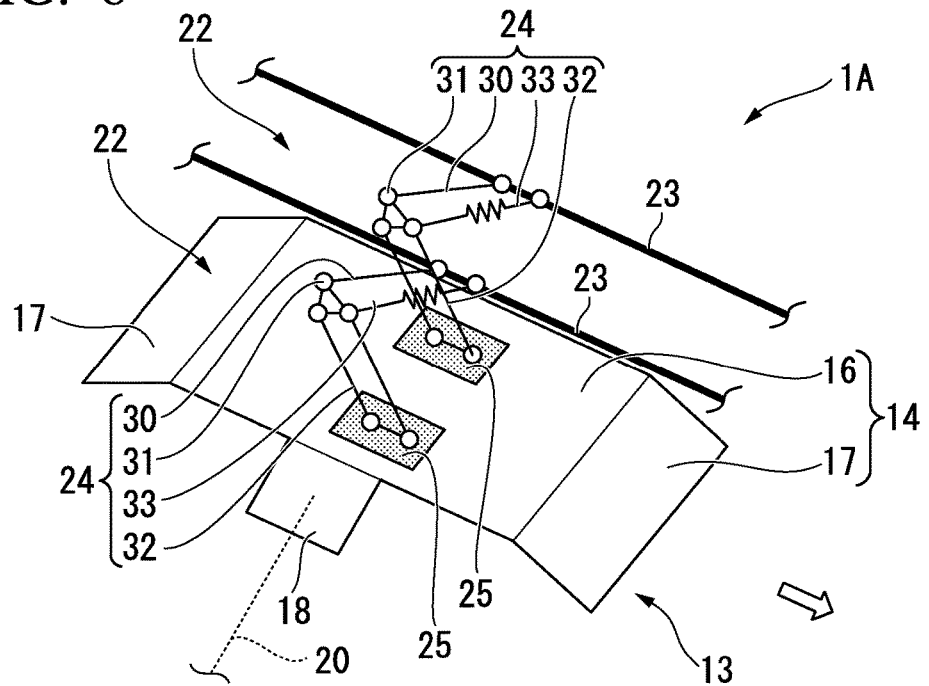
FIG. 8 is an enlarged perspective view illustrating a power-receiving section and a power-supply section in a traffic system according to a second embodiment of the present invention.

As illustrated in FIG. 8, a plurality of power-supply sections 22 (two in the present embodiment) are provided in parallel in a widthwise direction of a vehicle body 12.

When a vehicle 2 is located at a power-supply position, a power-supply shoe 25 of each power-supply section 22 is configured to be located within a flat surface 16 so as not to deviate from the flat surface 16 of the power-receiving section 13 in a forward and backward direction and in the widthwise direction of the vehicle body 12.

According to the traffic system 1A of the present embodiment, the power with a high current can be supplied by the plurality of power-supply sections 22. Thus, in this case, since a load per each of the power-supply sections 22 can be reduced, a structure of each of the power-supply sections 22 can be simplified.

Further, even if a failure occurs at any of the power-supply sections 22, the power can be supplied by the other power-supply section 22. That is, due to a fail-safe function, the power can be stably supplied to the vehicle 2.

Third Embodiment

Next, a traffic system 1B according to a third embodiment of the present invention will be described.

The same components as in the first and second embodiment are given the same reference signs, and detailed description thereof will be omitted.

In the present embodiment, the configuration of the second embodiment is used as a basic configuration, and a power-receiving section 13 is different from that of the second embodiment.

Figure 9:
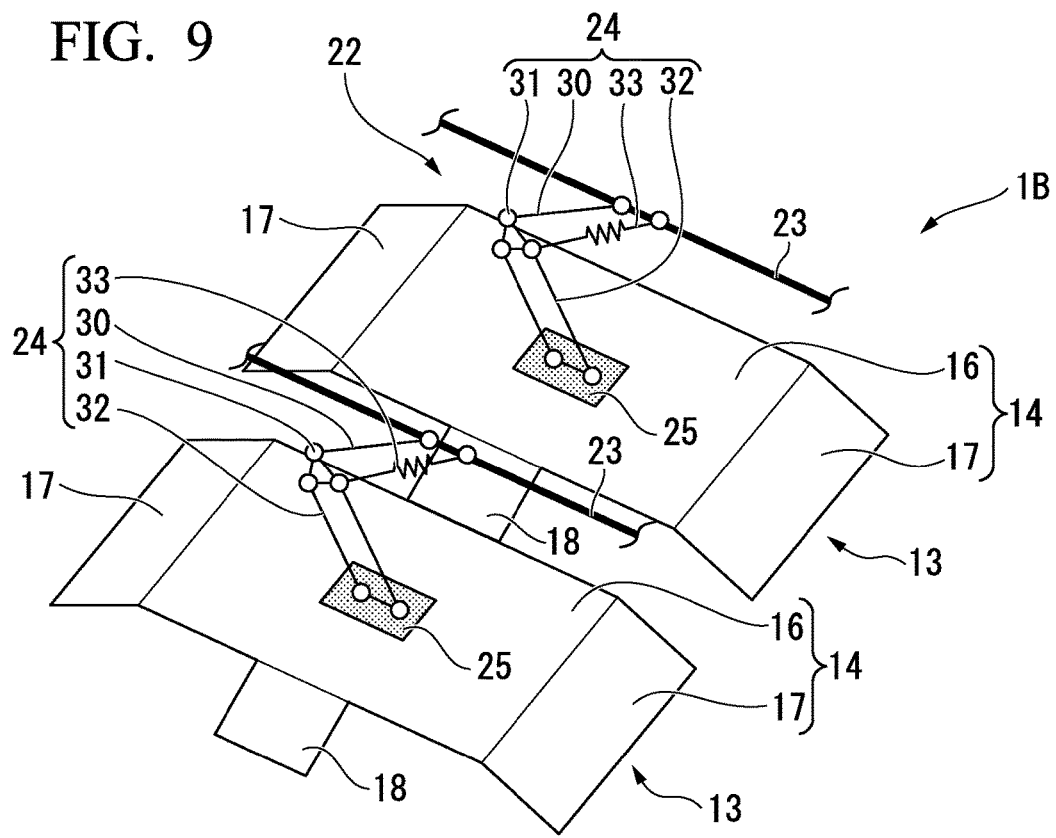
FIG. 9 is an enlarged perspective view illustrating a power-receiving section and a power-supply section in a traffic system according to a third embodiment of the present invention.

As illustrated in FIG. 9, similar to the second embodiment, a plurality of power-supply sections 22 (two in the present embodiment) are provided in parallel in a widthwise direction of a vehicle body 12. Further, a plurality of power-receiving sections 13 (two in the present embodiment) are provided in parallel in the widthwise direction of the vehicle body 12.

The plurality of power-receiving sections 13 are electrically connected in such a way that a terminal surface 18 at one of the neighboring power-receiving sections 13 is connected to a flat surface 16 of the other of the neighboring power-receiving sections 13.

In addition, when a vehicle 2 is located at a power-supply position, a power-supply shoe 25 of one of the power-supply sections 22 is located so as not to deviate from the flat surface 16 of one of the power-receiving sections 13 in a forward and backward direction and in a widthwise direction. That is, when the power is supplied, one of the power-supply sections 22 and one of the power-receiving sections 13 are configured as a pair so as to come into contact with each other.

According to the traffic system 1B of the present embodiment, the power with a high current can be supplied by the plurality of power-receiving sections 13. Thus, in this case, since a load per each of the power-receiving sections 13 can be reduced, a structure of each of the power-receiving sections 13 can be simplified.

Further, even if a failure occurs at any of the power-receiving sections 13, the power can be received from the other power-supply section 22 by the other power-receiving section 13. That is, due to a fail-safe function, the power can be stably supplied to the vehicle 2.

In the present embodiment, the power is supplied by the plurality of power-supply sections 22 and the plurality of power-receiving sections 13. However, for example, one power-receiving section 13 is provided with respect to the plurality of power-supply sections 22, and a plurality of configurations using the plurality of power-supply sections 22 and one power-receiving section 13 in this way may be provided in parallel. That is, a plurality of configurations having the power-supply sections 22 and the power-receiving section 13 in the second embodiment are provided in parallel in the widthwise direction.

Although the embodiments of the present invention have been described in detail, a change in design is also more or less possible without departing from the technical idea of the present invention.

For example, the shape of the tapered surface is not limited to the above-described case, and the tapered surface may have a curved surface shape, which is a guide surface that is capable of guiding the power-supply shoe 25 to the flat surface 16.

In addition, in the above-described embodiments, the supply of power in the new overhead wireless traffic systems 1, 1A, and 1B has been described. However, the supply of power can be applied to other electric vehicles such as an electric bus.

INDUSTRIAL APPLICABILITY

According to the above-described traffic system and power supply method, an excellent contact state between the power-receiving section and the power-supply section can be obtained by the guide surface and the biasing part, and power can be supplied regardless of the position of the vehicle.

The invention claimed is:
1. A traffic system comprising:
a vehicle having a power-receiving section on an outer surface of the vehicle;
a ground facility having a power-supply section for supplying the power-receiving section with power by coming in contact with the power-receiving section, and
a contact detection unit that is provided at the ground facility and detects a contact state between the power-receiving section and the power-supply section, wherein
a first component that is one of the power-receiving section and the power-supply section has:
a link member which applies biasing force to the first component so that the first component is biased toward a second component that is the other of the power-receiving section and the power-supply section, wherein the second component has:
a flat surface that extends along the outer surface of the vehicle, and
guide surfaces that are connected to the flat surface in forward and backward moving directions of the vehicle and guide the first component to the flat surface against the biasing force to bring the first component into contact with the flat surface when the vehicle moves backward or forward, and
wherein the link member has:
a first connecting member that extends from the first component toward the second component and is relatively rotatable in a three-dimensional direction between the first component and the second component;
a rotating member that is attached to a lower end of the first connecting member and is relatively rotatable in a three-dimensional direction with respect to the first connecting member;
a second connecting member that extends from the rotating member toward the second component;

a power-supply shoe that is attached to the second connecting member and configured to contact the second component; and a biasing part that is provided between the rotating member and the first component and configured to bias the power-supply shoe toward the second component.

2. The traffic system according to claim 1, wherein the guide surfaces have tapered surfaces that extend from connecting portions between the flat surface and the tapered surfaces in the forward and backward moving directions and in which tip portions opposite to the connecting portions in the forward and backward moving directions are farther away from the one of the power-receiving section and the power-supply section which has the biasing part than the connecting portions.

3. The traffic system according to claim 1, wherein the power-receiving section is provided at a floor portion or a lateral portion of the vehicle.

4. The traffic system according to claim 1, wherein a plurality of power-supply sections are provided.

5. The traffic system according to claim 1, wherein a plurality of power-receiving sections are provided.

6. A power supply method for supplying the power to the power-receiving section using the power-supply section in the traffic system according to claim 1, the power supply method comprising:

a guiding step of guiding one of the power-receiving section and the power-supply section which has the biasing part to the flat surface against the biasing force using the guide surface so as to bring the one of the power-receiving section and the power-supply section into contact with the flat surface;

a power-supply step of beginning to supply the power after the guiding step; and a power-supply-completing step of terminating the supply of power when the supply of a preset amount of power is completed.

7. The power supply method according to claim 6, further comprising:

a contact-checking step of checking the contact state between the power-receiving section and the power-supply section between the guiding step and the power-supply step in response to a signal from the contact detection unit that is provided at the ground facility and detects the contact state between the power-receiving section and the power-supply section; and a contact-adjusting step of performing position adjustment of at least one of the vehicle, the power-receiving section, and the power-supply section based on a result of the contact-checking step and adjusting the contact state.

* * * * *